United States Patent [19]

Crosbie et al.

[11] 4,456,631

[45] Jun. 26, 1984

[54] ELECTRONICALLY CONDUCTIVE LITHIA DOPED OXIDE CERAMICS FOR USE IN SODIUM SULFUR BATTERIES

[75] Inventors: Gary M. Crosbie, Dearborn; Gerald J. Tennenhouse, Southfield; Ragnar P. Tischer, Birmingham; Halina S. Wroblowa, West Bloomfield, all of Mich.

[73] Assignee: Ford Motor Company, Dearborn, Mich.

[21] Appl. No.: 503,201

[22] Filed: Apr. 19, 1983

[51] Int. Cl.$^3$ ............................................. H01M 10/39
[52] U.S. Cl. ...................................... 429/104; 252/518
[58] Field of Search ....................... 429/104, 163, 176; 252/518

[56] References Cited

U.S. PATENT DOCUMENTS

| | | | |
|---|---|---|---|
| 3,959,013 | 5/1976 | Breiter | 136/6 FS |
| 3,966,492 | 6/1976 | Ludwig | 136/6 FS |
| 3,985,575 | 10/1976 | Ludwig | 429/103 |
| 3,994,745 | 11/1976 | Ludwig | 429/81 |
| 4,048,390 | 9/1977 | Chatterji | 429/102 |
| 4,084,042 | 4/1978 | Ludwig | 429/104 |
| 4,110,516 | 8/1978 | Breiter | 429/104 |
| 4,117,209 | 9/1978 | Markin et al. | 429/104 |
| 4,131,226 | 12/1978 | Breiter | 228/198 |
| 4,160,069 | 7/1979 | Johnson et al. | 429/104 |
| 4,216,275 | 8/1980 | Hartmann et al. | 429/104 |
| 4,226,922 | 10/1980 | Sammells | 429/104 |
| 4,232,098 | 11/1980 | Park et al. | 429/104 |
| 4,248,943 | 2/1981 | Ludwig et al. | 429/104 |

FOREIGN PATENT DOCUMENTS

| | | | |
|---|---|---|---|
| 2013022 | 1/1979 | United Kingdom | 429/104 |

OTHER PUBLICATIONS

"Electrical Conduction in $Fe_2O_3$ and $Cr_2O_3$," D. de Cogan and G. A. Lonergan, Solid State Communications, vol. 15, pp. 1517-1519, 1974.

Primary Examiner—Donald L. Walton
Attorney, Agent, or Firm—Lorraine S. Melotik; Roger L. May

[57] ABSTRACT

This invention relates to electrically conductive ceramic materials suitable for use at high temperatures and in the presence of corrosive environments, e.g., the sodium-sulfur battery. The ceramic material comprises chromium oxide ($Cr_2O_3$) doped with at least 0.02 mole percent lithia, wherein the chromium oxide contains less than about 0.5 mole percent of any impurity selected from the group consisting of sodium oxide and potassium oxide, based on moles of chromium oxide. The doped chromium oxide can be used as coatings on metal or metal alloy so as to form corrosion resistant current collectors which may be container/current collectors.

17 Claims, No Drawings

ELECTRONICALLY CONDUCTIVE LITHIA DOPED OXIDE CERAMICS FOR USE IN SODIUM SULFUR BATTERIES

TECHNICAL FIELD

This invention relates to electronically conductive, corrosion resistant ceramic materials suitable for use in high temperature applications in the presence of corrosive environments. More particularly, this invention relates to lithia doped chromium oxide suitable as coatings for the container and the current collector in energy conversion devices such as the sodium sulfur battery.

BACKGROUND ART

Secondary batteries employing sulfur electrodes operate at relatively high temperatures which accelerate the corrosion of cell materials which contact the sulfur, e.g., the container/current collector. Container corrosion can have diverse effects: apart from attacking the material and "eating up" active reactant (thereby reducing capacity), it forms surface layers that increase contact resistance to the electrode normally used in such batteries. Also soluble corrosion products can be redeposited, clogging the electrode, obstructing transport of active materials, and causing uneven current distribution. If deposited on the electrode surface, they change its structure and wettability and therewith the kinetics of reactions occurring at this surface to the point where it may become partially or completely blocked. Corrosion products can also be deposited on the surface of the solid electrolyte partially blocking, damaging or destroying it by causing locally excessive current densities or by direct interaction or penetration.

In an attempt to overcome these corrosion problems, a variety of electrically conductive materials have been proposed as coatings for the container current collector in a Na/S battery.

In U.S. Pat. No. 3,959,013, a proposal is made to use a corrosion resistant and electronically conducting layer of molybdenum or graphite to reduce the corrosion associated with such a battery. The corrosion resistant coating is placed on the surface of the metallic container which is to confine the molten sodium polysulfide and sulfur reactants.

In a similar manner, U.S. Pat. No. 4,048,390 suggests that a protective coating of aluminum be placed on the surface of the battery container which is to confine the polysulfide and sulfur reactants. This patent proposes the use of aluminum because it forms a continuous layer of aluminum sulfide over its exposed surfaces.

U.S. Pat. No. 4,110,516 takes still another direction in trying to develop a corrosion resistant container to confine the sodium polysulfide and sulfur reactants. The patent suggests forming the confining container of aluminum and then placing over the aluminum either a single layer of chrome or a layer of zinc and a layer of chrome thereover, the chrome surface being the surface which faces up against the corrosive reactants which are to be confined therewithin.

U.S. Pat. No. 4,131,226 once again discloses a sulfur electrode container for a sodium sulfur battery in which a liner material is used as an anticorrosive surface for a mild steel container. The patent teaches that the discrete liner of clad material can be formed of metal such as stainless steel, molybdenum or a nickel/chromium alloy, as specifically disclosed therein.

In U.S. Pat. No. 4,160,069, the current collector comprises a corrosion resistant ceramic member and an intimately attached metal cladding. The ceramics employed comprise doped rutile $TiO_2$, doped calcium titanate and lanthanum strontium chromite.

U.S. Pat. No. 4,216,275 attempts to overcome the corrosive nature of the polysulfide melt of a Na/S battery by providing a light metal cell wall which is coated first with a prime coat of nickel and aluminum, and then applying on this prime coat, a coating of an alloy of chromium and at least one metal of the group iron, cobalt or nickel.

U.S. Pat. No. 4,226,922 suggests that longevity of the cathodic current collector can be obtained if the metallic current collector has a boronized surface and an additional boron source in physical proximity to the boronized current collector surface.

Still another approach to forming a non-corrosive, electrically conductive component for a sodium sulfur cell is taught in U.S. Pat. No. 4,232,098. The component comprises a fiber-carbon substrate and a non-porous chromium-iron-carbon duplex alloy surface layer chemically diffusion bonded to the substrate.

In U.S. Pat. No. 4,248,943 a coating of chromium/chromium oxide is placed on the surfaces of the electrically conducting components of a Na/S battery to combat corrosion by molten sodium polysulfide and sulfur reactant.

Few conductive materials can withstand the attack of the polysulfide melt at the operating temperature of the Na/S cell.

Metals are thermodynamically unstable. They form sulfides, whose solubility in the melt is, in most cases, not negligible. Some metals like chromium, molybdenum, tungsten, and aluminum become covered by protective layers which, however, lose their passivating properties under certain conditions. Ceramic materials such as chromium oxide, which exhibit good corrosion stability in polysulfide melts, do not however have sufficient electronic conductivity to be employed in current collectors. Dopants are sometimes employed in ceramics to increase the conductivity of the ceramics. However some dopants, e.g., NiO, while increasing conductivity of $Cr_2O_3$, compromise its corrosion resistance.

Useful coatings employed on the container/current collector of a Na/S cell must have good corrosion stability to the polysulfide melt, sufficient conductivity, and preferential wettability for sodium polysulfide rather than sulfur. It has now been found that chromium oxide ($Cr_2O_3$) material doped with lithium oxide, $Li_2O$, satisfies these requirements. In addition to these inherent material properties, chromium oxide coatings display the following characteristics: adherence to the substrate under conditions of thermal cycling, cost viability and a relatively simple method of deposition on the substrate.

The fact that lithium increases the conductivity of chromium oxides is quite unexpected, since chemically similar elements sodium and potassium are undesirable contaminants to chromium oxide, which limit electrical conductivity.

DISCLOSURE OF THE INVENTION

The invention of this application comprises an improved electrically conductive current collector suitable for use at high temperatures and in the presence of corrosive environments, characterized in that the current collector comprises: metal or metal alloy having a ceramic coating thereon, at least in the region in contact with the corrosive environment, wherein the ceramic coating comprises chromium oxide doped with at least about 0.02, preferably between about 0.025–1 mole percent lithium oxide based on moles of chromium oxide, and the lithia doped chromium oxide contains less than about 0.5, still more preferably less than about 0.1 mole percent of any impurity selected from the group consisting of sodium oxide and potassium oxide. Preferably, the ceramic coating has a thickness of between about 0.1 $\mu$m and about 20 $\mu$m and a resistivity of less than about 100 ohm-centimeters at the temperatures of the environment in which the current collector is employed, e.g., in an electrochemical cell or battery. Preferably the metal or metal alloy, having the ceramic oxide coating, comprises chromium. In a modified embodiment of the current collector of this invention, a layer of chromium, preferably an alloy comprising chromium, may be employed as a current conducting layer between the doped ceramic oxide layer and other electrically conducting components made, e.g., of iron.

This invention is also directed to the ceramic coating material described above and to an electrochemical cell or battery employing the current collector described above wherein the current collector may serve as a current collector/container.

Advantageously, the ceramic coating materials of this invention current collector have shown no signs of corrosion to corrosive materials such as sulfur or polysulfides, when exposed to polysulfide melt at 350° C. for periods of up to 6 months. During this time, they were polarized anodically, cathodically, and/or cycled at current densities sufficient to expose the ceramic surfaces to the entire span of melt compositions between sulfur and $Na_2S_3$, to which parts of the container (current collector) can be exposed locally. Still further, it has been found that while the resistivity of the doped ceramic oxide may increase somewhat upon exposure to the environment of a sulfur/polysulfide melt, advantageously the resistivity stabilizes at acceptable values.

BEST MODE FOR CARRYING OUT THE INVENTION

As discussed briefly above, the current collector of this invention comprises the combination of an electronically conducting doped ceramic oxide, which is corrosion resistant to the substances to which the current collector is to be exposed at elevated temperatures, with a metal conductor intimately attached to the ceramic-metal interface.

The doped ceramic oxide of this invention, as described above, comprises chromium oxide ($Cr_2O_3$) doped with at least about 0.02, preferably between about 0.025–1, most preferably about 0.5 mole percent lithium oxide, $Li_2O$, wherein the mole percent of lithia dopant is based on the moles of the chromium oxide. The chromium oxide employed in this invention contains less than about 0.5 mole percent of sodium oxide or potassium oxide impurities, based on moles of chromium oxide.

In preferred embodiments of this invention, the doped chromium oxide contains less than about 0.1 mole percent of $Na_2O$ less than about 0.1 mole percent $K_2O$ impurites, based on moles of $Cr_2O_3$. Commercially available chromium oxides which may be suitably used to form this preferred embodiment ceramic oxide include high purity (HP) chromium oxide which generally contains less than about 0.02 mole percent sodium oxide and less than about 0.03 mole percent potassium oxide. It has been found that thus limiting these impurities in the $Cr_2O_3$ has the effect of significantly lowering the resistivity of the lithia doped chromium oxide.

One method of making the doped ceramic oxide of this invention comprises adding chromium oxide and the dopant, or more generally, a material capable of generating the dopant to acetone and milling the mixture. After drying the powder, it is calcined and subsequently milled. Materials which may be employed to provide the lithium oxide dopant, include, but are not limited to, lithium nitrate, lithium hydroxide, or lithium carbonate with lithium nitrate being most preferred. While one method of preparing the doped ceramic oxide has been described above, other commonly employed methods for preparing the doped ceramic oxide of this invention would be well known to those skilled in the art. The doped ceramic may also be subjected to further heat treating, such as oxidizing or annealing in air and sintering. Doped ceramic oxides according to this invention may be used to form coatings or hot pressed objects having densities generally greater than 90%, generally greater than about 95%, of theoretical. By subjecting the doped ceramic oxide coated current collector, e.g., having a chromium alloy substrate to oxidizing treatment, uncoated sites on the substrate which are connected to micropores in the coating would be converted to corrosion resistant chromium oxide. While chromium oxide is itself nonconducting, such oxidizing treatment will not have an adverse effect on the resistivity of the doped coating.

The doped ceramic oxide powder may be used to coat a metal or metal alloy conductor by a variety of methods which include sputtering and plasma spraying. Sputtering techniques which could be used in this invention for applying a coating of the ceramic oxides on a substrate are well known in the art. One description of this technique is found in the book "Thin Film Processes", J. L. Vossen and W. Kern, editors, Academic Press, N.Y., 1978. Similarly, a reference exemplifying the plasma spraying of ceramic oxides is "Plasma Spraying with Chromium Oxides", P. Boch, P. Fauchais, and A. Borie, pp. 208–211 of P. Vincenzini Ed., *Advances in Ceramic Processing* (3rd CIMTEC, Rimini, Italy, 1976), Natl. Res. Council, Faenza, Italy, 1977.

Suitable metal or metal alloys on which the ceramic may be applied to form the current collector of this invention include, but are not limited to, aluminum, nickel, chromium, iron, silicon, molybdenum and their alloys, gold, platinum and combinations of these. Chromium and, more particularly, alloys containing chromium are preferred with ferritic alloys containing chromium being most preferred. The ceramic coating is generally applied on the metal or metal alloy to a thickness of between about 0.1 $\mu$m and about 20 $\mu$m, whereby the ceramic oxide coating has a resistivity of less than about 100 ohm-centimeter. More preferably, the resistivity of the doped ceramic is less than about 10 ohm-centimeter as can be obtained with lithia doped chromium oxide having less than about 0.1 mole percent each of $Na_2O$ and $K_2O$ impurities.

In one embodiment of this invention, the current collector can serve as a current collector container of an electrical cell or battery. Exemplary of this embodiment, a container, e.g., stainless steel container, may be internally coated with a doped chromium oxide taught herein. In another embodiment of the invention of this application, it may be desirable to employ a layer of metal or metal alloy between the ceramic oxide and the electrically conducting component. In this second embodiment, the intermediate layer comprises a metal or metal alloy as those described above, preferably however this intermediate layer comprises an alloy comprising chromium. For example, a layer of an alloy comprising chromium (ferritic stainless steel) may be employed between the doped ceramic oxide coating and a component containing iron (e.g., mild steel). Thus if the container of an electromechanical cell or battery is mild steel, the alloy comprising chromium layer and subsequently the ceramic coating would be layered on the inside of the container, affording a corrosion resistant, electrically conducting container/current collector. This intermediate layer could be applied by a variety of methods including sputtering, aqueous electroplating, plasma spraying, etc.

Current collectors of the invention as described above would be useful as current collectors or as current collector/containers in a variety of applications wherein a corrosion resistant, electronically conducting member operative at high temperatures is desirable, such as in electrochemical cells or batteries, e.g., molten carbonate fuel cells of Na/S batteries. Current collectors of this invention wherein the ceramic coatings have resistivities of less than about 100 ohm-centimeter, preferably less than about 10 ohm-centimeters, are most useful in such applications. The ceramic oxide coatings on the current collectors preferably suitable for use in Na/S batteries consist of chromium oxide containing less than 0.1 mole percent $Na_2O$ impurity and doped with greater than 0.02 mole percent, preferably between about 0.025–1 mole percent, most preferably about 0.5 mole percent lithium oxide. A Na/S battery is an electrical conversion device of the type which comprises (1) an anodic reaction zone containing a molten alkali metal reactant-anode in electrical contact with an external circuit; (2) a cathodic reaction zone containing a cathodic reactant comprising a molten liquid electrolyte which is electrochemically reactive with the anodic reactant and a current collector at least one surface of which is exposed to the cathodic reactant; and (3) a cation permeable barrier to mass liquid transfer interposed between and in contact with the anodic and cathodic reaction zones, the current collector being in electrical contact with both the cation-permeable barrier and said external circuit. The current collector may also serve as a container for the cathodic reactant. In a Na/S battery, the anodic reactant is sodium and the cathodic reactant comprises molten polysulfide salts or a mixture of sulfur and sulfur saturated molten polysulfide salts. Such sodium/sulfur electrical storage cells are well known to those skilled in the art and are disclosed in the following U.S. Pat. Nos. 3,404,035; 3,404,036; 3,413,150; 3,446,677; 3,458,356; 3,468,709; 3,468,719; 3,475,220; 3,475,223; 3,475,225; 3,535,163; and 3,719,531.

The following examples are presented by way of description of the composition of the invention and set forth to best mode contemplated by the inventors but are not to be construed as limiting.

EXAMPLE 1

The process and performance of a lithium oxide doped high purity chromium oxide are described in this example.

Chromium oxide of high purity was used in combination with lithium nitrate. The composition was chosen to result in a 0.5 mol. % solid solution of lithium oxide in $Cr_2O_3$. The principal impurities in the oxide were determined by mass spectrometric analysis to be Na and V (50 ppmw), K (100 ppmw), and Al, Ca, Fe, S and Si (20 ppmw). Chlorine (1000 ppmw) present in the starting powder would be expected to volatilize in subsequent processing. The lithium nitrate was dried at 220° C. and crushed to a fine powder.

The oxide (75 gram) and nitrate (0.34 gram) were added to reagent grade acetone (105 mL) and milled. The resulting slurry was ultrasonically dispersed and then stirred to dryness at low heat. The dry powder was calcined for 1 hour at 1100° C. in air and lightly milled.

A seventy-five (75) gram amount of powder was prepressed without binder in steel dies, which were lubricated with silicone spray. The resulting preform was coated with lubricating grade boron nitride, which was slurried in ethanol. The billet was hot-pressed in a prefired graphite die at the following conditons: 28 MPa, 1300° C., for 1 hour. A density of 96.1% of theoretical maximum density (which is 5.21 g/cm$^3$) was achieved.

The billet was annealed for 6 hours at 1500° C. in air. Rectangular bars were diamond ground from the central section of the billet.

Characteristics of the material were as follows: Grain size was approximately 18 micrometers. The electrical resistivity at 350° C. was between 4.4 and 4.0 ohm-cm. The temperature dependence of resistivity corresponded to a value of 0.32 to 0.37 eV. The bars were subjected to a corrosive environment consisting of sodium polysulfide at 350° C.

Sodium polysulfide was prepared according to standard procedures from reagent sodium monosulfide and resublimed sulfur. In particular, the components were melted in a closed ampoule for 24 hours and powdered after cooling. The test sample was dove-tailed and fastened by Dylon cement to a high purity graphite rod. Voltammetric and resistance measurements were carried out through the course of a 183 day exposure with current flowing. During this time, the sample was exposed anodically, cathodically, as it was cycled at current densities which were sufficient to expose the sample surface to the entire span of melt compositions between sulfur and sodium trisulfide, to which part of the container (current collector) can be exposed locally. At the 20 day point, the in situ method related to a resistivity of 10.8 ohm-cm. After 183 days, the ex situ method revealed a resistivity of 47 ohm-cm. No sign of corrosion was observed by surface examination (SEM, EDX, AES)* or by analysis of the melt.

*(SEM: Scanning Electron Microscopy, EDX: Energy Dispersive X-ray Analysis, AES: Auger Electron Spectroscopy).

The resistivity of the material stabilized after 20 days of exposure and remained for 6 months at the same value which was suitably low for its use as a container coating material.

EXAMPLE 2

The process and performance of a lithium oxide doped moderate purity chromium oxide are described in this example.

Chromium oxide of moderate purity was used in combination with lithium nitrate (dried as in Example 1). The composition was chosen to result in a 0.5 mol.% solid solution of lithium oxide in $Cr_2O_3$. The principal impurities in the oxide were determined by mass spectrometric analysis and wet chemical analysis to be Na (1,500 ppmw), Ca (200 ppmw), P and Si (100 ppmw) and K(5ppmw). Sulfur (less than 5000 ppmw as sulfate) present in the starting powder would be expected to volatilize in subsequent processing.

The oxide (150 gram) and nitrate (0.78 gram) were added to reagent grade acetone (180 mL) and milled. The resulting slurry was ultrasonically dispersed and then stirred to dryness at low heat. The dry powder was calcined for 1 hour at 1100° C. in air and lightly milled.

One hundred fifty gram amount of powder was prepressed into a billet which was then hot-pressed as described in Example 1. A density of 99.5% of theoretical maximum density (which is 5.21 g/cm$^3$) was achieved.

The billet was annealed for 6 hours and 1500° C. in air. Rectangular bars were diamond ground from the central section of the billet.

Characteristics of the material were as follows: Grain size was approximately 3 micrometers. The electrical resistivity at 350° C. was 66 ohm-cm. The temperature dependence of resistivity corresponded to a value of 0.50 eV in the temperature range between 300 and 350° C.

Although the doped ceramic oxide of this Example has good corrosion resistance, its higher resistivity as compared to the material in Example 1, made it relatively less desirable for use in as a coating for current collectors.

EXAMPLE 3

The use of a radio-frequency sputtered coating of lithium-oxide doped chromium oxide is described in this Example.

The sputtering target is prepared by plasma-spraying of a powder produced by the method of Example 1 which is carried through the step of calcining. The plasma-sprayed coating is applied to a thermally cooled target base of stainless steel in the form of a 3 inch (75 mm) disk. A coating of thickness approximately 200 μm is applied to provide material sufficient for many sputtering runs.

Sputtering is carried out using argon gas and a rotating holder for a bullet shaped rod of stainless steel of E-Brite, which had been sand-blasted and etched. (E-Brite is a ferrite alloy having 26 weight percent chromium and 1 weight percent molybdenum.) A thickness of coating of 2 μm is estimated for the sputter deposit in this case.

The test sample so formed is threaded onto a Mo rod, inverted, and immersed into sodium polysulfide melt at 350° C., in much the same manner as in Example 1.

EXAMPLE 4

The process and performance of a lithium oxide doped high purity chromium oxide are described in this example.

Chromium oxide of high purity as in Example 1 was used in combination with lithium nitrate. The composition is chosen to result in a 1.0 mol. % solid solution of lithium oxide in $Cr_2O_3$. The principal impurities in the oxide are determined by mass spectrometric analysis to be Na and V (50 ppmw), K(100 ppmw) and Al, Ca, Fe, S and Si (20 ppmw). Chlorine (1,000 ppmw) present in the starting powder would be expected to volatilize in subsequent processing. The lithium nitrate was dried at 220° C. and crushed to a fine powder.

The oxide (75 gram) and nitrate (0.69 gram) is added to reagent grade acetone (105 mL) and milled. The resulting slurry is ultrasonically dispersed and then stirred to dryness at low heat. The dry powder is calcined for 1 hour at 1100° C. in air and lightly milled.

As in Example 1, a seventy-five (75) gram amount of powder is prepressed and coated with boron nitride. The billet is hot-pressed and annealed for 6 hours at 1500° C. in air. Rectangular bars are diamond ground from the central section of the billet.

Characteristics of the material were as follows: Grain size is approximately 18 micrometers. The electrical resistivity at 350° C. is estimated to be between 2.1 and 5.2 ohm-cm. The bars are subjected to a corrosive environment consisting of sodium polysulfide at 350° C.

EXAMPLE 5

The use of a reactively sputtered coating of lithium-oxide doped chromium oxide is described in this Example.

The sputtering target is prepared by plasma-spraying of a powder produced by the method of Example 1 which is carried through the step of calcining. The plasma-sprayed coating is applied to a thermally cooled target base of stainless steel in the form of a 3 inch (75 mm) disk. A coating of thickness approximately 200 μm is applied to provide material sufficient for many sputtering runs. A line is drawn on the target with lithium metal to increase the lithium content to 1.0 mol. percent.

Sputtering is carried out using argon gas, oxygen gas and a rotating holder for a bullet shaped rod of stainless steel of E-Brite, which had been sand-blasted and etched. A thickness of coating of 2 μm is estimated for the sputter deposit in this case.

The test sample so formed is threaded onto a Mo rod, inverted, and immersed into sodium polysulfide melt at 350° C., in much the same manner as in Example 1.

In view of the disclosure, many modifications of this invention will be apparent to those skilled in the art. It is intended that all such modifications which fall within the true scope of this invention be included within the terms of the appended claims.

We claim:

1. An electrically conductive ceramic material suitable for use at high temperatures and in the presence of corrosive environments, characterized in that said conductive ceramic material comprises chromium oxide ($Cr_2O_3$) doped with at least 0.02 mole percent lithium oxide based on moles of said chromium oxide, wherein said chromium oxide contains less than about 0.5 mole percent of any impurity selected from the group consisting of sodium oxide and potassium oxide, based on moles of said chromium oxide.

2. An electrically conductive ceramic material according to claim 1, wherein said lithium oxide dopant is present in a range of between about 0.025 and about 1 mole percent.

3. An electrically conductive ceramic material according to claim 2, wherein said chromium oxide, doped with said lithium oxide contains less than about 0.1 mole percent of any impurity selected from the group consisting of sodium oxide and potassium oxide based on moles of chromium oxide.

4. An electrically conductive ceramic material according to claim 1, wherein said ceramic material has a density greater than about 90 percent theoretical.

5. An improved electrically conductive current collector suitable for use at high temperatures and in the presence of corrosive environments, characterized in that said current collector comprises a metal or metal alloy having a ceramic coating thereon, at least in the region in contact with said corrosive environment, wherein said ceramic coating comprises chromium oxide doped with at least 0.02 mole percent lithium oxide based on moles of said chromium oxide, wherein said chromium oxide contains less than about 0.5 mole percent of any impurity selected from the group consisting of sodium oxide and potassium oxide based on moles of chromium oxide.

6. An improved electrically conductive current collector according to claim 5, wherein said ceramic coating has a thickness of between about 0.1 μm and about 20 μm and a resistivity of less than about 100 ohm-centimeter at the temperatures of the environment in which said current collector is employed.

7. An improved electrically conductive current collector according to claim 5, wherein a layer comprising an alloy of chromium is located between said metal or metal alloy and said ceramic coating.

8. An improved electrically conductive current collector according to claim 5, wherein said lithium oxide dopant is present in a range of about 0.025 and about 1 mole percent.

9. An improved electrically conductive current collector according to claim 8, wherein said lithium oxide dopant is present in an amount of about 0.5 mole percent.

10. An improved electrically conductive current collector according to claim 6, wherein said chromium oxide doped with said lithium oxide contains less than about 0.1 mole percent of any impurity selected from the group consisting of sodium oxide and potassium oxide based on moles of said chromium oxide.

11. An improved electrically conductive current collector according to claim 5, wherein said metal or metal alloy is selected from the group consisting of aluminum, nickel, chromium, silicon, iron, molybdenum and their alloys, gold, platinum, and combinations thereof.

12. An improved electrically conductive current collector according to claim 11, wherein said metal or metal alloy comprises chromium.

13. In an electrochemical cell or battery comprising:

(1) an anodic reaction zone containing a molten alkali metal reactant anode in electrical contact with an external circuit; (2) a cathodic reaction zone containing a cathodic reactant comprising a molten liquid electrolyte which is electrochemically reactive with said anodic reactant and a current collector at least one surface of which is exposed to said cathodic reactant; and (3) a cation permeable barrier to mass liquid transfer interposed between and in contact with said anodic and cathodic reaction zones, said current collector being in electrical contact with both said cation-permeable barrier and said external circuit, wherein the improvement comprises:

employing as said current collector in said device a current collector comprising a metal or metal alloy having a ceramic coating thereon, at least in the region in contact with said cathodic reactant, wherein said ceramic coating comprises chromium oxide doped with at least 0.02 mole percent lithium oxide based on moles of chromium oxide, wherein said chromium oxide contains less than about 0.5 mole percent of any impurity selected from the group consisting of sodium oxide and potassium oxide, based on moles of chromium oxide, said current collector being disposed within said cathodic reaction zones such that said ceramic coating but not said metal or metal alloy is exposed to said molten cathodic reactant.

14. An electrical conversion device according with claim 13, wherein said current collector also serves as a container for said cathodic reactant.

15. An electrical conversion device according to claim 13, wherein said anodic reactant is sodium and said cathodic reactant comprises molten polysulfide salts or a mixture of sulfur and sulfur saturated molten polysulfide salts.

16. An electrical conversion device according to claim 13, wherein said ceramic coating consists of said chromium oxide doped with said lithium oxide, containing less than about 0.1 mole percent of any impurity selected from the group consisting of sodium oxide and potassium oxide based on moles of chromium oxide.

17. An electrical conversion device according to claim 16, wherein said lithium oxide dopant is present in an amount of between about 0.025 and about 1 mole percent.

* * * * *